(12) United States Patent
Teranishi et al.

(10) Patent No.: US 7,583,402 B2
(45) Date of Patent: Sep. 1, 2009

(54) IMAGE FORMING DEVICE AND IMAGE FORMING SYSTEM

(75) Inventors: Katsuyuki Teranishi, Osaka (JP); Hidechika Kumamoto, Osaka (JP)

(73) Assignee: Kyocera Mita Corporation, Osaka (JP)

( * ) Notice: Subject to any disclaimer, the term of this patent is extended or adjusted under 35 U.S.C. 154(b) by 779 days.

(21) Appl. No.: 11/258,879

(22) Filed: Oct. 27, 2005

(65) Prior Publication Data

US 2007/0097432 A1 May 3, 2007

(51) Int. Cl.
*G06F 3/12* (2006.01)
*G06K 15/00* (2006.01)
*G06F 12/00* (2006.01)

(52) U.S. Cl. .................. 358/1.16; 358/1.13; 358/1.15; 711/115

(58) Field of Classification Search ................ 358/1.15, 358/1.16, 1.17, 1.18, 1.13, 3.28, 524, 444; 382/305, 306, 307; 711/115
See application file for complete search history.

(56) References Cited

U.S. PATENT DOCUMENTS

| | | | |
|---|---|---|---|
| 6,356,357 B1* | 3/2002 | Anderson et al. | 358/1.17 |
| 6,473,811 B1* | 10/2002 | Onsen | 710/15 |
| 6,498,658 B1 | 12/2002 | Sekikawa | |
| 6,832,010 B2* | 12/2004 | Miyazaki et al. | 382/305 |
| 7,113,720 B2* | 9/2006 | Hirano | 399/80 |
| 7,264,411 B2* | 9/2007 | Matsunaga et al. | 400/62 |
| 7,382,938 B2* | 6/2008 | Kizaki et al. | 382/305 |
| 2002/0051019 A1* | 5/2002 | De Vorchik et al. | 345/835 |
| 2003/0184803 A1* | 10/2003 | Yamada et al. | 358/1.16 |
| 2005/0128319 A1* | 6/2005 | Morino | 348/231.7 |
| 2005/0141043 A1* | 6/2005 | Nakazawa | 358/444 |
| 2005/0193170 A1* | 9/2005 | Endo | 711/115 |
| 2006/0044949 A1* | 3/2006 | Ferlitsch | 369/30.01 |
| 2006/0077424 A1* | 4/2006 | Maruta et al. | 358/1.15 |
| 2006/0265743 A1* | 11/2006 | Kusunoki et al. | 726/21 |

FOREIGN PATENT DOCUMENTS

| | | |
|---|---|---|
| JP | H04-153822 A | 5/1992 |
| JP | H11-136477 A | 5/1999 |
| JP | 2001-266112 A | 9/2001 |
| JP | 2002-041337 A | 2/2002 |

* cited by examiner

*Primary Examiner*—Twyler L Haskins
*Assistant Examiner*—Jonathan R Beckley
(74) *Attorney, Agent, or Firm*—Global IP Counselors, LLP

(57) ABSTRACT

This image forming device 1 comprises an image processing unit 9, an HDD 23 and an image forming unit. The image processing unit 9 is capable of instructing the output of the image data sent from the PC 43. The HDD 23 is connected to the image processing unit 9 and is capable of storing the image data to be delivered. The image forming unit is capable of receiving the instruction from the image processing unit 9 and delivering onto paper or the like the image data stored in the HDD 23. Then, when the ID information contained in the image data is detected by the image processing unit 9, writing of image data to the HDD 23 is prohibited.

5 Claims, 1 Drawing Sheet

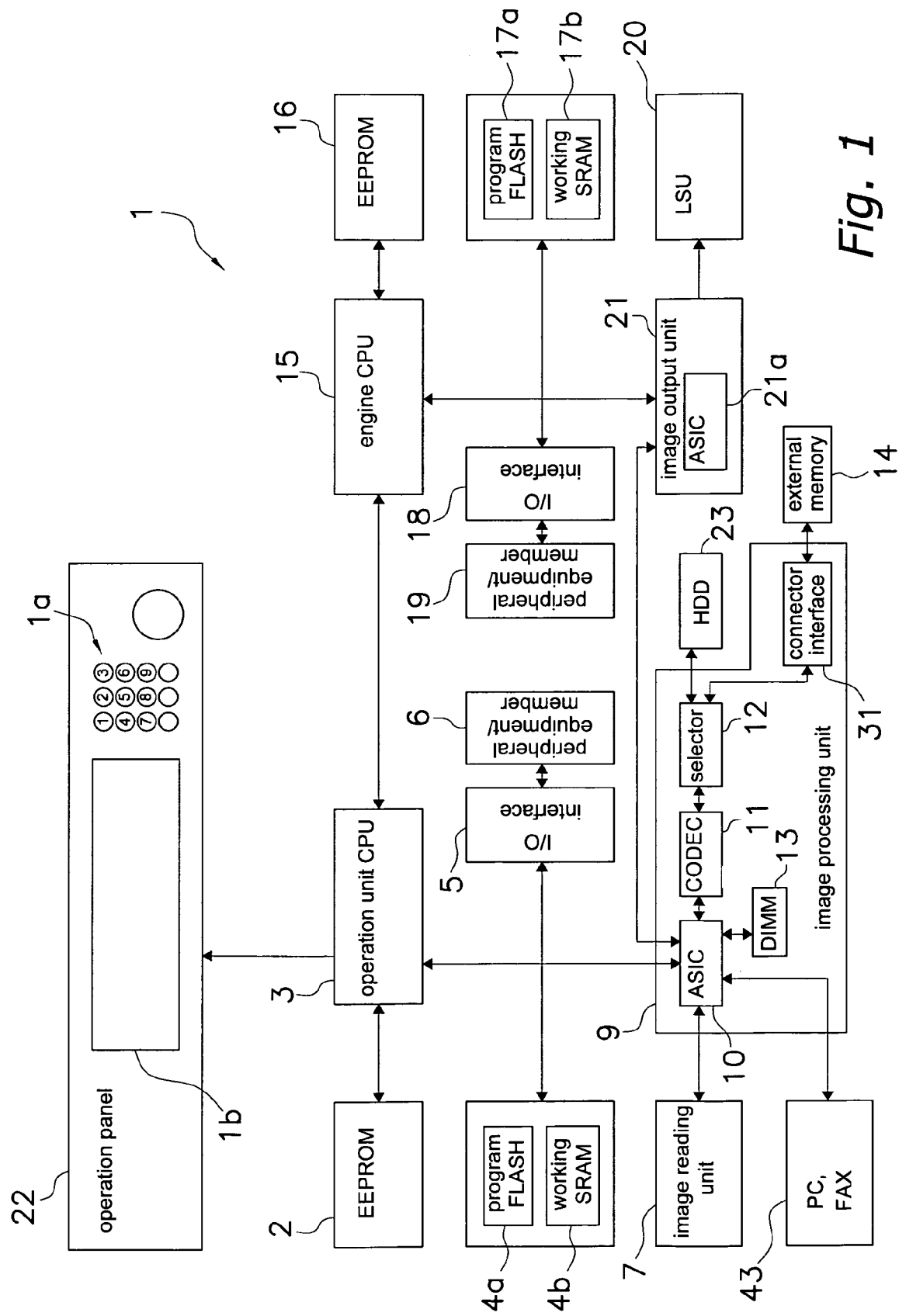

IMAGE FORMING DEVICE AND IMAGE FORMING SYSTEM

FIELD OF THE INVENTION

The present invention relates to an image forming device and an image forming system.

BACKGROUND INFORMATION

A conventional image forming device, for instance a digital copying machine, comprises an image reading unit, a storage device for temporarily storing the image data read by the image reading unit, and an output means for reading and delivering onto a transfer medium the image data stored in the storage device. A nonvolatile memory, such as a hard disk, is generally used as the storage device.

In such a copier, the image data remains in the storage device after the image data output until it is overwritten by the image data of the next document. If, for instance, the copier is disposed of in this state, and the internal hard disk or the like is taken out, in some cases, the image data remaining on the disc is analyzed and externally disclosed. This problem is serious, in particular when image data containing highly confidential information have been handled.

Thus, conventionally, a method has already been proposed in which a confidential document mode is provided, and if this mode has been set, the image data is deleted when the image data output is finished, and a method has been proposed in which the image data is deleted while the image forming device is idle.

However, deleting image data requires some time. In particular, if a hard disk is used as the storage device, for deleting image data that has been stored, an A4 size image data requires on the order of 0.75 seconds to be deleted, and the time required to delete 80 pages of image data is on the order of 60 seconds.

In addition, while the image data is being deleted, the next process such as printing cannot be carried out continuously, leading to the problem of drop in processing efficiency.

An object of the present invention is to prevent external disclosure of image data while avoiding a drop in processing efficiency in an image forming device wherein image data is stored in a storage device during output.

SUMMARY OF THE INVENTION

The image forming device according to claim 1 comprises a control unit, a first storage device and an output device. The control unit is capable of instructing the output of predetermined image data. The first storage device is connected to the control unit and is capable of storing the output image data. The output device is capable of receiving the instruction from the control unit and delivering onto the transfer medium the image data stored in the first storage device. Then, when special information contained in the image data is detected by the control unit, writing of the image data to the first storage device is prohibited.

In this device, image data received from the outside or the like is first written to the first storage device by the control unit then delivered onto paper or the like. In so doing, if the image data contains special information, writing to the first storage device is prohibited when this special information is detected. Therefore, at this point, it is possible to avoid leaving highly confidential image data, such as that including special information, in the device and thereby being externally disclosed, by ensuring that this data is not written to the first storage device.

In addition, in the present invention, the image data also includes text data. In addition, the predetermined image data includes, for instance, image data read with the image reading unit when functioning as a copier, image data sent by an externally connected device such as a personal computer (PC) or a scanner when functioning as a printer, and image data sent by another facsimile when functioning as a facsimile. Furthermore, the output image data includes image data for which predetermined image processing is finished and is ready for output onto the transfer medium. In addition, the control unit may contain a plurality of control systems.

In addition, for instance, the first storage device may be a hard disk drive device (HDD).

Furthermore, examples of special information include ID information, visible predetermined marks or patterns, and other specific information. Examples of ID information include information stored in an ID tag of an RF-ID (Radio Frequency Identification) from an image reading unit if the image forming device comprises an image reading unit capable of reading document image data, digital watermark information embedded in the document, bar codes and the like.

The image forming device according to claim 2 is the device of claim 1 further comprising an interface connected to the control unit, and a second storage device capable of storing the image data to be delivered and removably connectable to the interface. Then, the control unit writes the image data to the second storage device when the special information contained in the image data is detected.

In this device, when writing of the image data to the first storage device is prohibited in the device of claim 1, output to paper or the like is made possible, by writing this image data to the second storage device instead of the first storage device.

Note that in the present invention, the interface includes dedicated drives and general-purpose interfaces (USB, IEEE 1394 or the like) Examples of the second storage device include custom products using a general-purpose memory such as a hard disk, a Compact Flash™ or a micro-drive, and a nonvolatile memory, and storage devices with a battery or the like backing up a volatile memory such as an SDRAM, or the like.

The image forming device according to claim 3 is the device of claim 2 further comprising a display unit capable of displaying whether any storage device is being written in by the control unit.

In this device, when a plurality of storage devices are present, displaying whether any of these is being written to can give peace of mind to the user.

The image forming device according to claim 4 is the device of claim 2, wherein the control unit is capable of recognizing the capacity of the second storage device connected to the interface. In addition, it further comprises a display unit capable of displaying the capacity of the second storage device.

In this device, useful information can be provided to the user by indicating the storage capacity of the second storage device.

The image forming device according to claim 5 is the device of claim 2, wherein the control unit is capable of recognizing the free space in the second storage device connected to the interface. This device further comprises a display unit capable of displaying, in case the size of the image data to be written to the second storage device exceeds the capacity of the free space, an indication of the same.

In this device, for instance, when an attempt is made to write an image data of a size that cannot be accommodated by the second storage device, the user is informed beforehand.

The image forming system according to claim 6 comprises the image forming device as recited in claim 1 and an image data sending device. The image data sending device is connected to the image forming device in a communication capable manner and is capable of image data transmission, while, at the same time, it is capable of including special information in the image data.

With this image forming system, if an image forming device is connected to an image data sending device, it is possible to avoid leaving highly confidential information in the image forming device by a remote operation, by including special information in the image data on the image data sending device side.

Note that, in the present invention, image data sending devices include externally connected equipment capable of transmitting image data such as a computer in which a printer driver for the image forming device is installed, a facsimile and the like; and image data in this case includes print data held by the computer, incoming facsimile data or the like.

Examples of modes for including special information in these image data include entering an ID with an input means provided to the computer, and if the image forming device is registered in a facsimile, instructing the image forming device with an F code when transmitting image data from this facsimile.

According to the image forming device of the present invention, if the image data contains special information, writing to the first storage device is prohibited when this special information is detected. Therefore, at this point, it is possible to avoid leaving highly confidential image data, such as that including special information, in the device and thereby being externally disclosed, by ensuring that this data is not written to the first storage device.

According to the image forming system of the present invention, if an image forming device is connected to an image data sending device, on the image data sending device side, it is possible to avoid leaving highly confidential information in the image forming device by a remote operation, by including special information in the image data on the image data sending device side.

BRIEF DESCRIPTION OF THE DRAWINGS

FIG. 1 is a block diagram schematically showing the constitution of an image forming system in which one embodiment of the present invention has been applied.

DETAILED DESCRIPTION OF THE PREFERRED EMBODIMENTS

[Constitution of the Image Forming System]

An image forming system 41 in which one embodiment of the present invention has been applied is shown in FIG. 1.

This image forming system 41 comprises an image forming device 1 and a PC (image data sending device) 43.

PC 43 is connected through a communication line 45 such as a LAN cable to the image forming device. A printer driver for the image forming device 1, is installed on the PC 43. In addition, the PC 43 has a storage device, and is capable of transmitting to the image forming device 1, image data held within this storage device and image data downloaded from over the Internet.

Furthermore, the PC 43 has an input unit consisting of a keyboard and a mouse, and is capable of entering an ID information. When transmitting image data to the image forming device 1, if an ID information is entered, the PC 43 includes the entered ID information in the image data, and if printing is instructed, it generates an output signal and delivers it to the image forming device 1.

[Image Forming Device]

The image forming device 1 is a multi-function machine having combined functions as a copier, a printer, a facsimile and a scanner, and comprises as the main control system an operation unit CPU 3, an engine CPU 15, an image processing unit 9, and an image output unit 21.

The operation unit CPU 3 performs control and the like of a control panel 22, and is connected to a backup EEPROM 2, the engine CPU 15 and the image processing unit 9. The control panel 22 has a plurality of operation keys 1a and a touch panel type display unit 1b.

The display unit 1b, in addition to displaying various operation screens and the like, displays whether the image processing unit 9 writes to either of an external memory 14 (second storage device) or an HDD (first storage device) 23, the capacity and free space of the external memory 14, indications that the size of the image data to be written in the external memory 14 exceeds the capacity of the free space, and the like.

A peripheral device and a member 6 are connected through an input-output interface 5 to a FLASH 4a serving as a program memory for the operation unit CPU 3 and an SDRAM 4b serving as a working RAM.

The engine CPU 15 performs control or the like of the engine, and is connected to a backup EEPROM 16, the operation unit CPU 3 and the image output unit 21. The engine contains an image forming unit (output device) such as a photosensitive drum and peripheral device therefor, and various electrical components a including peripheral device and a member 19 containing a main motor, various sensors, a fixing device heater, a paper feeding device clutch and the like, and a peripheral device and a member 6 containing a scanner motor, lamps, various sensors and the like, of the image reading unit 7, not shown. The image forming unit receives instruction from the image output unit 21 and forms images on paper or the like image with the data stored in the HDD 23 or the external memory 14. A peripheral device and a member 19 are connected through an input-output interface 18 to a FLASH 17a serving as a program memory for the engine CPU 15 and an SRAM 17b serving as a working RAM.

The image processing unit 9 is connected to an image reading unit 7 and a PC 43 and is capable of performing various image processes on image data received therefrom. In addition, the image processing unit 9 is connected to the operation unit CPU 3, the image output unit 21 and the HDD 23. The image processing unit 9 is primarily constituted by an ASIC 10, a CODEC 11, a selector 12, a DIMM 13, and a connector interface 31. The DIMM 13, together with the HDD 23, constitute the internal memory.

The ASIC 10 of the image processing unit 9, is capable of switching the selector 12 to switch the saving destination of the image data, while it is at the same time capable of detecting the ID information (special information). Specifically, if the external memory 14 is connected to the connecting interface, if an ID information or the like is detected, writing of the image data to the HDD 23 is prohibited, while at the same time, the image data is written to the external memory 14. On the other hand, if the external memory 14 is not connected to the connector interface 31, or even if it is connected but no ID status is detected, the image data that underwent image processing is written to the HDD 23.

In addition, the ASIC 10 of the image processing unit 9 can also recognize whether the external memory 14 has been connected to the connector interface 3, the capacity and free space of the external memory 14, whether the image data is being written to either the memories 23 or 14, whether the size of the image data to be written to the external memory 14 exceeds the free capacity, and the like.

The connector interface 31 has an open portion (not shown) for receiving the connector terminal (not shown) of the external memory 14.

The external memory 14 is constituted by a general-purpose memory capable of deleting the memory content, has a connector terminal for mounting on the connector interface 31, and is removable from the connector interface 31. The image data delivered from the image output unit 21 to the engine CPU 15 is stored in the external memory 14. Note that examples of general-purpose memory used here as external memory 14 include Compact Flash™, micro-drive and the like.

The HDD 23 is for writing to with image data that do not contain ID information or the like, and is connected to the selector 12.

The DIMM 13 is an internal memory where programs for various processes to be executed by the ASIC 10 are stored. The image output unit 21 is mainly constituted by an ASIC 21a, and is connected to a laser scanner unit (LSU) 20, the engine CPU 15 and the image processing unit 9. The image output unit 21, when instructed to print, reads the image data stored in the external memory 14 or the HDD 23 and delivers it to the LSU 20.

[Operation of the Image Forming System]

Next, the working of the image forming system 41 will be described.

In this image forming system 41, when trying to print image data that must be kept confidential, the external memory 14 is connected beforehand to the image processing unit 9 by inserting it into the connector interface 31. At this moment, the indication that the external memory 14 has been connected, the capacity and free space of the external memory 14, and the like, are displayed on the display unit 1b of the control panel 22.

Then, in the PC 43, when the desired image data to be printed is selected while ID information is entered with the input device and printing is instructed, an output signal is sent to the image forming device 1, and in the image forming device 1 that has received this signal, various image processes are performed in the image processing unit 9. At this moment, the ID information is detected, and the writing destination is switched from the HDD 23 to the external memory 14 by the selector 12.

Next, the image data for which processing by the image processing unit 9 has finished is written to the external memory 14 at the same time as it is sent to the image forming unit through the image output unit 21 and the LSU 20 to be delivered onto paper.

After printing, if the external memory 14 is read out by way of the connector interface 31, the data can be separately saved in the PC 43 or deleted in the PC 43, as necessary.

On the other hand, when trying to print image data that need not be kept confidential, the output signal is transmitted by instructing from the PC 43 to print, without inserting the external memory 14 into the connector interface 31 or, even if the external memory 14 has been inserted into the connector interface 31, without entering ID information in the PC 43.

Then, in the image forming device 1 that has received the output signal, the image data that underwent image processing by the image processing unit 9 is written to the HDD 23 while at the same time it is sent to the image forming unit through the image output unit 21 or the like to be delivered onto paper, in the same manner as described above.

In addition, the image data that has been written to the HDD 23 can be deleted by operating the control panel 22, as necessary.

According to the image forming system 41 described above, highly confidential image data can be stored in the external memory 14 without being stored in the HDD 23 by applying ID information with the PC 43 Then, as this external memory 14 can be removed as mentioned above, highly confidential image data does not remain within the device 1, allowing external disclosures to be circumvented. In addition, as the external memory 14 that is removed is in general managed by the user who gave the printing instruction, the danger of external disclosures is further diminished.

Furthermore, according to this image forming device 1 herein, when writing the image data to the external memory 14, this is achieved without an overwrite process, which is needed when writing to the HDD 23, and without requiring the time for such a process.

In addition, herein, as a general-purpose memory is used as the external memory 14, by connecting the external memory 14 that has been removed to another interface connected to a PC or the like, the memory content can, for example, be saved in the PC or deleted by performing a simple operation.

[Other Embodiments]

(a) The constitution may be such that, in the above embodiment setting is possible in such a way that reading of the image, spooling of the print data, reception of facsimile receipt data, and output, cannot be carried out as long as an external memory is not connected to the connecting interface.

(b) A facsimile may be connected to the image forming device instead of a PC or in parallel to a PC, in the above-mentioned embodiment. In this case the same effect as in the mentioned embodiment described above can be obtained by a constitution in which the ID is entered via an F code when transmitting image data from the facsimile to the image forming device, and writing to the external memory 14 if the image forming device detects this ID information.

What is claimed is:

1. An image forming device comprising:
   a control unit that instructs the output of an image data;
   a first storage device being connected to the control unit and that stores the image data;
   an output device that receives a print instruction from the control unit and delivers onto a transfer medium the image data stored in the first storage device;
   an interface being connected to the control unit; and
   a second storage device being removably connected to the interface and that stores the image data to be delivered from the output device,
   the control unit prohibiting writing of the image data to the first storage device when special security information contained in the image data is detected by the control unit, and
   the control unit allowing writing of the image data to the second storage device when the special security information contained in the image data is detected by the control unit.

2. The image forming device according to claim 1, further comprising a display unit that displays whether the control unit is writing to any storage device.

3. The image forming device according to claim 1, wherein the control unit recognizes a capacity of the second storage device connected to the interface, and further comprising a display unit that displays the capacity of the second storage device.

4. The image forming device according to claim 1, wherein the control unit recognizes a free space in the second storage device connected to the interface, and further comprising a display unit that displays this indication in a case when the size of the image data to be written to the second storage device exceeds a capacity of the free space.

5. An image forming system comprising: the image forming device as recited in claim 1, and an image data sending device being connected to the image forming device and that concurrently transmits image data through a communication and including the special information within the image data.

* * * * *